(12) United States Patent
Ahluwalia

(10) Patent No.: US 7,981,819 B2
(45) Date of Patent: *Jul. 19, 2011

(54) FIRE RESISTANT MATTRESS FABRIC MATERIAL AND MATTRESS

(75) Inventor: Younger Ahluwalia, Desoto, TX (US)

(73) Assignee: Elk Corporation of Dallas, Dallas, TX (US)

(*) Notice: Subject to any disclaimer, the term of this patent is extended or adjusted under 35 U.S.C. 154(b) by 1283 days.

This patent is subject to a terminal disclaimer.

(21) Appl. No.: 11/018,724

(22) Filed: Dec. 20, 2004

(65) Prior Publication Data

US 2010/0003878 A1    Jan. 7, 2010

Related U.S. Application Data

(62) Division of application No. 09/955,395, filed on Sep. 18, 2001, now Pat. No. 6,858,550.

(51) Int. Cl.
  *B32B 27/04* (2006.01)
  *B27N 9/00* (2006.01)

(52) U.S. Cl. ........ 442/64; 442/65; 442/66; 442/67; 442/70; 442/71; 442/79; 442/97; 442/101; 442/123; 442/136; 442/180; 428/920; 428/921

(58) Field of Classification Search ............ 442/64, 442/65, 66, 67, 70, 71, 79, 97, 136, 101, 442/123, 180; 428/920, 921
See application file for complete search history.

(56) References Cited

U.S. PATENT DOCUMENTS

| | | | |
|---|---|---|---|
| 4,174,420 A | 11/1979 | Anolick et al. | |
| 4,229,329 A | 10/1980 | Bennett | 524/44 |
| 4,495,238 A | 1/1985 | Adiletta | 428/215 |
| 4,745,032 A | 5/1988 | Morrison | 428/215 |
| 4,746,565 A | 5/1988 | Bafford et al. | 442/243 |
| 4,784,897 A | 11/1988 | Brands et al. | 428/219 |
| 4,994,317 A | 2/1991 | Dugan et al. | 442/72 |
| 5,001,005 A | 3/1991 | Blanpied | 442/373 |
| 5,091,243 A | 2/1992 | Tolbert et al. | 442/60 |
| 5,965,257 A | 10/1999 | Ahluwalia | 428/357 |
| 6,051,193 A | 4/2000 | Langer et al. | 422/179 |
| 6,228,497 B1 | 5/2001 | Dombeck | 428/392 |
| 6,365,533 B1 | 4/2002 | Horner, Jr. et al. | 442/374 |

FOREIGN PATENT DOCUMENTS

| | | |
|---|---|---|
| GB | 926749 | 5/1963 |
| GB | 2167060 | 5/1986 |
| WO | 9903338 | 1/1999 |
| WO | 0163986 | 8/2001 |

OTHER PUBLICATIONS

T.J. Ohlemiller et al., *Flammability Assessment Methodology for Mattresses*, NISTIR 6497, Jun. 2000.
State of California Department of Consumer Affairs Bureau of Home Furnishings and Thermal Insulation Technical Bulletin 129, Oct. 1992, *Flammability Test Procedure for Mattresses for use in Public Buildings*.

*Primary Examiner* — Norca L Torres-Velazquez
(74) *Attorney, Agent, or Firm* — Baker Botts LLP

(57) ABSTRACT

A fire resistant fabric material comprising a substrate having an ionic charge which is coated with a coating having essentially the same ionic charge. The coating consists essentially of a filler material comprising clay and a binder material. The substrate is preferably fiberglass, the filler material may further comprise at least one additional filler selected from the group consisting of decabromodiphenyloxide, antimony trioxide, fly ash, charged calcium carbonate, mica, glass microspheres and ceramic microspheres and mixtures thereof and the binder material is preferably acrylic latex.

6 Claims, No Drawings

FIRE RESISTANT MATTRESS FABRIC MATERIAL AND MATTRESS

CROSS-REFERENCE TO RELATED APPLICATION

This application is a divisional of U.S. patent application Ser. No. 09/955,395 filed Sep. 18, 2001, now U.S. Pat. No. 6,858,550.

BACKGROUND OF THE INVENTION

This invention relates to fire resistant fabric materials comprising a substrate having an ionic charge coated with a coating having essentially the same charge and consisting essentially of a filler material and a binder material. The filler material includes clay.

For many years substrates such as fiberglass have been coated with various compositions to produce materials having utility in, among other applications, the building industry. U.S. Pat. No. 5,001,005 relates to structural laminates made with facing sheets. The laminates described in that patent include thermosetting plastic foam and have planar facing sheets comprising 60% to 90% by weight glass fibers (exclusive of glass micro-fibers), 10% to 40% by weight non-glass filler material and 1% to 30% by weight non-asphaltic binder material. The filler materials are indicated as being clay, mica, talc, limestone (calcium carbonate), gypsum (calcium sulfate), aluminum trihydrate (ATH), antimony trioxide, cellulose fibers, plastic polymer fibers or a combination of any two or more of those substances. The patent further notes that the filler materials are bonded to the glass fibers using binders such as urea-, phenol- or melamine-formaldehyde resins (UF, PF, and MF resins), or a modified acrylic or polyester resin. Ordinary polymer latexes used according to the disclosure are Styrene-Butadiene-Rubber (SBR), Ethylene-Vinyl-Chloride (EVCl), PolyVinylidene Chloride (PvdC), modified PolyVinyl Chloride (PVC), PolyVinyl Alcohol (PVOH), and Poly-Vinyl Acetate (PVA). The glass fibers, non-glass filler material and non-asphaltic binder are all mixed together to form the facer sheets.

U.S. Pat. No. 4,745,032 discloses an acrylic coating comprised of one acrylic underlying resin which includes fly ash and an overlying acrylic resin which differs from the underlying resin.

U.S. Pat. No. 4,229,329 discloses a fire retardant coating composition comprising fly ash and vinyl acrylic polymer emulsion. The fly ash is 24 to 50% of the composition. The composition may also preferably contain one or more of a dispersant, a defoamer, a plasticizer, a thickener, a drying agent, a preservative, a fungicide and an ingredient to control the pH of the composition and thereby inhibit corrosion of any metal surface to which the composition is applied.

U.S. Pat. No. 4,784,897 discloses a cover layer material on a basis of a matting or fabric which is especially for the production of gypsum boards and polyurethane hard foam boards. The cover layer material has a coating on one side which comprises 70% to 94% powdered inorganic material, such as calcium carbonate, and 6% to 30% binder. In addition, thickening agents and cross-linking agents are added and a high density matting is used.

U.S. Pat. No. 4,495,238 discloses a fire resistant thermal insulating composite structure comprised of a mixture of from about of 50% to 94% by weight of inorganic microfibers, particularly glass, and about 50% to 6% by weight of heat resistant binding agent.

U.S. Pat. No. 5,091,243 discloses a fire barrier fabric comprising a substrate formed of corespun yarns and a coating carried by one surface of the substrate. The coating comprises a carbonific compound, a catalyst and a source of a non-flammable gas. The coating additionally comprises thickening agents and blowing agents.

Many different coating compositions have been formulated over the years but often such compositions would bleed through substrates, such as fiberglass substrates, if the substrates were coated on just one side, unless the compositions had a high binder content and/or included viscosity modifiers to enhance the viscosity of the coating composition. To prevent bleed through, such coating compositions sometimes had their viscosity increased by blowing or whipping air into the compositions. Although such blown compositions did not bleed through to the other side of mats such as fiberglass mats, the raw material costs for the compositions were high because of the numbers of constituent elements involved.

U.S. Pat. No. 5,965,257, the entire disclosure of which is incorporated herein by reference, discloses a structural article having a coating which includes only two major constituents, while eliminating the need for viscosity modifiers, for stabilizers or for blowing. The structural article of U.S. Pat. No. 5,965,257 is made by coating a substrate having an ionic charge with a coating having essentially the same ionic charge. The coating consists essentially of a filler material and a binder material. By coating the substrate with a coating having essentially the same ionic charge, the patentee developed a zero bleed through product while using only two major ingredients in the coating and eliminating the need for costly and time consuming processing steps such as blowing. Structural articles may thus be produced having a low binder content and no viscosity modifiers. U.S. Pat. No. 5,965,257 issued to Elk Corporation of Dallas, the assignee of the present application. Elk produces a product in accordance with the invention of U.S. Pat. No. 5,965,257 which is marketed as VersaShield®.

As indicated in U.S. Pat. No. 5,965,257, VersaShield® has many uses. However, it has been found that the products of U.S. Pat. No. 5,965,257 are unable to provide a satisfactory fabric material because they lack adequate drapability characteristics. The applicant has discovered, however, that by including clay as a filler component in the coating of the article, a fire resistant fabric material may be produced which has satisfactory flexibility, pliability and drapability characteristics.

SUMMARY OF THE INVENTION

The present invention relates to a fire resistant fabric material comprising a substrate having an ionic charge coated with a coating have essentially the same ionic charge. The substrate may be any suitable reinforcement material capable of withstanding processing temperatures and is preferably fiberglass. The coating is comprised principally of a filler and a binder. The binder is preferably acrylic latex and the filler comprises clay and may further include an additional filler selected from the group consisting of antimony trioxide, decabromodiphenyloxide, charged calcium carbonate, fly ash, mica, glass or ceramic microspheres and mixtures thereof.

The fire resistant fabric material may be used on its own or in conjunction with (e.g. as a liner for) a decorative fabric which may itself be fire resistant. The present invention also relates to an article of manufacture comprising the fire resistant fabric material including, inter alia, mattress fabrics, mattress covers, upholstered articles, building materials, bedroom articles, (including children's bedroom articles), draperies, carpets, tents, awnings, fire shelters, sleeping bags, ironing board covers, barbecue grill covers, fire resistant gloves, engine liners, and fire-resistant clothing for race car drivers, fire fighters, jet fighter pilots, and the like. The use of the fire resistant fabric materials of the present invention for manufacturing fabrics for use in articles such as mattresses, cribs, drapes and upholstered furniture, may enable the article to exceed current flammability standards for these types of articles.

DETAILED DESCRIPTION

In accordance with the invention, a fire resistant fabric material is made by coating a substrate having an ionic charge with a coating having essentially the same ionic charge. The coating consists essentially of a filler material and a binder material. By coating the substrate with a coating having essentially the same ionic charge, the applicant has developed a fire resistant fabric material while using mainly two major ingredients in the coating and eliminating the need for viscosity modifiers, thickening agents and costly and time consuming processing steps such as blowing.

The coated substrate of the present invention may be any suitable reinforcement material capable of withstanding processing temperatures, such as glass fibers, polyester fibers, cellulosic fibers, asbestos, steel fibers, alumina fibers, ceramic fibers, nylon fibers, graphite fibers, wool fibers, boron fibers, carbon fibers, jute fibers, polyolefin fibers, polystyrene fibers, acrylic fibers, phenolformaldehyde resin fibers, aromatic and aliphatic polyamide fibers, polyacrylamide fibers, polyacrylimide fibers or mixtures thereof which may include bicomponent fibers.

Examples of substrates in accordance with the invention include, inter alia, glass, fiberglass, ceramics, graphite (carbon), PBI (polybenzimidazole), PTFE, polyaramides, such as KEVLAR™ and NOMEX™, metals including metal wire or mesh, polyolefins such as TYVEKT™, polyesters such as DACRON™ or REEMAY™, polyamides, polyimides, thermoplastics such as KYNAR™ and TEFZELT™, polyether sulfones, polyether imide, polyether ketones, novoloid phenolic fibers such as KYNOL™, KoSa™ polyester fibers, JM-137 M glass fibers, Owens-Corning M glass, Owens-Corning K glass fibers, Owens-Corning H glass fibers, Evanite 413M glass microfibers, Evanite 719 glass microfibers, cellulosic fibers, cotton, asbestos and other natural as well as synthetic fibers. The substrate may comprise a yarn, filament, monofilament or other fibrous material either as such or assembled as a textile, or any woven, non-woven, knitted, matted, felted, etc. material. The polyolefin may be polyvinyl alcohol, polypropylene, polyethylene, polyvinyl chloride, polyurethane, etc. alone or in combination with one another. The acrylics may be DYNEL, ACRILAN and/or ORLON. RHOPLEX AC-22 and RHOPLEX AC-507 are acrylic resins sold by Rohm and Haas which may also may be used. The cellulosic fibers may be natural cellulose such as wood pulp, newsprint, Kraft pulp and cotton and/or chemically processed cellulose such as rayon and/or lyocell. Nonlimiting examples of non-woven materials that may be useful in the present invention include non-woven, continuous fiberglass veils, such as Firmat™ 100, Pearlveil™ 110, Pearlveil™ 210, Curveil™ 120, Curveil™ 220, Flexiveil™ 130, Flexiveil™ 230 and Pultrudable veil (all available from Schmelzer Industries, Inc., Somerset, Ohio). The woven materials may be Airlaid™, Spunbond™ and Needlepunch™ (available from BFG Industries, Inc. of Greensboro, N.C.). Nonlimiting examples of filament materials include D, E, B, C, DE, G, H, K filaments of various grades, including electrical grade, chemical grade and high strength grade (all available from BFG Industries, Inc. of Greensboro, N.C.). In a preferred embodiment, the substrate is a woven fiberglass mat. As used herein, a fiberglass mat includes nonwoven and woven fiberglass mats.

As stated above, the filler material of the present invention preferably includes clay. The clay may be Paragon™, which is soft clay (i.e. it is soft to the touch), Suprex™, which is hard clay (i.e. it is hard to the touch), Suprex™ amino silane treated clay, which is used for crosslinking, since it will chemically bond with binder, and for highloading and Ballclay™, which has elastic properties (i.e. it feels rubbery). All of above-listed clay products are available, for example, from Kentucky-Tennessee Clay Company of Langley, S.C. In a preferred embodiment, the clay is Ballclay™ 3380 which is particularly inexpensive compared to other clays. In the present invention, clay is preferred because of its elongation properties (it has a low modulus), its abrasion resistance, its tear resistance, and its tensile strength. Moreover, clay is a good heat barrier; it does not disintergate when an open flame (temperature $\geq 1500°$ F.) is applied directly to a coating of the present invention that includes clay. In addition, clay provides a slick, elastic, glassy surface which exhibits flexibility. Furthermore, as noted, clay is inexpensive and thus can provide a low cost fabric material.

The filler material may further comprise an additional filler selected from the group consisting of decabromodiphenyloxide, antimony trioxide, charged calcium carbonate, fly ash (such as Alsil O4TR™ class F fly ash produced by JTM Industries, Inc. of Martin Lake and Jewett, Tex. which has a particle size such that less than 0.03% remains on an agitated 0.1 inch×0.1 inch screen), 3-X mineralite mica (available from Engelhard, Inc. of Louisville, Ky.) and glass or ceramic microspheres (glass microspheres are 2.5 times lighter than ceramic microspheres and also provide fire resistance), or any mixture of these filler materials to meet desired cost and weight criteria. Glass and ceramic microspheres are manufactured by Zeelan Industries of 3M Center Bldg., 220-8E-04, St. Paul, Minn. 55144-1000. Calcium carbonate may be obtained from Franklin Industrial Minerals of 612 Tenth Avenue North, Nashville, Tenn. 37203.

Calcium carbonate, talc and fly ash filler increase the weight of the product, but utilization of glass and/or ceramic microspheres enables the manufacture of a product with reduced weight and increased fire resistant properties. Clay may impart to the product the following nonlimiting characteristics: (1) lower heat build-up, (2) heat reflectance properties, (3) fire barrier properties, (4) no weight loss when exposed to heat and open flame, and (5) reduced disintegration when exposed to heat and open flame. Decabromodiphenyloxide and antimony trioxide impart the following nonlimiting characteristics: (1) flame retardant properties, (2) capability of forming a char, and (3) capability of stopping the spread of flames.

Glass and ceramic microspheres can withstand heat greater than 2000° F. Also, glass and ceramic microspheres increase compressive strength, absorb no latex and/or water and thus permit the faster drying of the product. Glass and ceramic microspheres also increase product flexibility.

Further, the glass and ceramic microspheres help to increase the pot life of the coating. Heavier particles in the fillers, although they may comprise but a small percentage of the particles in the filler, have a tendency to settle near the bottom of a storage vessel. When glass and/or ceramic microspheres are mixed together with another filler, a dispersion is produced which has an increased pot life or shelf life. Without wishing to be bound by any particular theory, it is believed that as the filler particles naturally fall in the vessel and the glass and ceramic microspheres rise, the smaller size filler particles are supported by the glass and/or ceramic microspheres, thus enabling the microspheres to stay in solution and preventing the filler particles, to at least some extent, from descending to the bottom of the vessel.

The use of the fire resistant fabric materials of the present invention for manufacturing fabrics for use in articles such as mattresses, cribs, drapes and upholstered furniture, may enable the article to exceed current flammability standards for these types of articles. While flammability standards for mattresses have not specifically been set by the federal or state governments, some government agencies have provided recommended guidelines.

For example, the United States Department of Commerce National Institute of Standards and Technology (NTIS) in Gaithersburg, Md. has published a paper relating to a methodology for assessing the flammability of mattresses. See T. J. Ohlemiller et al., *Flammability Assessment Methodology for Mattresses*, NISTIR 6497, June 2000. While no clear standard is given, it is recommended that a mattress be able to withstand the described test procedures. The NTIS has noted that beds pose a unique fire hazard problem and provide a series of tests for determining the flammability of mattresses. In addition, the State of California Department of Consumer Affairs Bureau of Home Furnishings and Thermal Insulation ("the Bureau") issued a Technical Bulletin in October 1992 which provides a flammability test procedure for mattresses. See State of California Department of Consumer Affairs Bureau of Home Furnishings and Thermal Insulation Technical Bulletin 129, October 1992, *Flammability Test Procedure for Mattresses for use in Public Buildings*. The technical bulletin provides standard methods for fire testing of mattresses. The methods produce data describing the burning behavior from ignition of a mattress until all burning has ceased, or after a period of one hour has elapsed. The rate of heat release is measured by an oxygen consumption technique. The Bureau indicates that mattresses complying with the test method will be safer and hopes that manufacturers will attempt to manufacture mattresses which pass the recommended tests. The Bureau indicates that "a mattress fails to meet the requirements of the test if any of the following criteria are exceeded:" (1) weight loss of 3 pounds or greater within the first 10 minutes due to combustion, (2) a maximum rate of heat release of 100 kW or greater, and (3) a total heat release of 25 MJ or greater in the first 10 minutes. A mattress manufactured with the fire resistant fabric material of the present invention is anticipated to comply with or exceed the test standards recommended both by the NTIS and the California Bureau. See Example 1 below.

As indicated above, the fire resistant fabric material of the present invention is useful in the manufacture of mattresses. In this embodiment of the invention, the fire resistant fabric material may be used to line a decorative fabric to produce a fire resistant mattress fabric. The lining may be achieved by methods known in the art. For example, the fire resistant fabric material of the present invention may simply be placed under a decorative fabric. Or, the fire resistant mattress material may be adhered to the decorative fabric, for example using a flexible and preferably nonflammable glue or stitched with fire resistant thread i.e., similar to a lining. The fire resistant mattress fabric of the present invention may then be used by the skilled artisan to manufacture a mattress which has improved flammability characteristics.

The table below provides, in percentages, the components of the coating the applicants have used in a preferred embodiment of the invention.

TABLE I

| Coating Components | % Wet | % Dry |
|---|---|---|
| BINDER | | |
| BFG Hycar ™ 2679 Latex | 25.000 | 23.123 |
| Cymel ™ 373 | 3.700 | 5.877 |
| Rhoplex ™ TR-407 | 4.500 | 3.826 |
| FILLER | | |
| Clay - mattress grade | 22.600 | 42.229 |
| Antimony trioxide | 3.000 | 5.606 |
| Decabromodiphenyloxide | 9.000 | 16.817 |
| WATER REPELLANT MATERIAL | | |
| Natrosol HEC ™ | 0.050 | 0.093 |
| Aurapel-391 ™ | 2.500 | 1.168 |
| Acrysol ™ ASE-95NP | 0.500 | 0.168 |
| MISCELLANEOUS | | |
| Water | 27.470 | 0.000 |
| Ammonium Hydroxide | 1.130 | 0.591 |
| Y-250 defoamer | 0.100 | 0.185 |
| W-4123 Blue Pigment | 0.500 | 0.318 |
| Total Percentage | 100% | 100% |

Although the table shows possible combinations of clay, decabromodiphenyloxide and antimony trioxide in the filler component of the coating, it is believed that other combinations of clay with the fillers listed above may be employed. For example, the decabromodiphenyloxide and antimony trioxide levels can be reduced and/or replaced with clay but the levels of these non-clay filler constituents are preferably not increased. Any changes in the combination of fillers should maintain the density, viscosity, fire resistance properties and low cost coating. The density, viscosity and fire resistance properties can be ascertained by the skilled artisan and are further described in Example 1 below.

The coating is prepared by using a binder material such as a high performance heat-reactive acrylic latex polymer to bond the filler materials together and to bond the filler to the substrate. Such a binder material is Hycar™ 2679 acrylic latex polymer supplied by B.F. Goodrich Company of Cleveland, Ohio. Binder components may also include Cymel™ 373 (available from American Cyanamid), RHOPLEX™ TR 407 and R&H GL-618 latex both available from Rohm & Haas, and Borden FG-413F UF resin (available from Borden). It is believed, however, that any linear polymer, linear copolymer or branched polymer may be useful in preparing the coating. Possible binder materials include butyl rubber latex, SBR latex, neoprene latex, polyvinyl alcohol emulsion, SBS latex, water based polyurethane emulsions and elastomers, vinyl chloride copolymers, nitrile rubbers and polyvinyl acetate copolymers.

The coating comprises approximately 50% by weight of the fire resistant fabric material. In the coating, about 20% to about 80% by weight is filler and from about 80% to about 20% is acrylic binder. In a preferred embodiment, the coating comprises about 50% filler and about 50% binder. The filler is preferably about 65% clay, 26% decabromodiphenyloxide, and 9% antimony trioxide. The substrate is preferably comprised of about 75% by dry weight Owens-Corning H Glass ½" and 25% by dry weight Evanite 719 Glass Microfiber. The substrate may also be, for example, a woven fabric of DE, E, H, or G filament available from BFG Industries. The substrate is approximately 50% by weight of the fire resistant fabric material. The binder which bonds together the glass fibers is approximately 100% B.F. Goodrich 2679 Acrylic Latex, but binder components may also include Cymel 373, citric acid, Rohm & Haas GL-618 Latex and Borden FG-413F UF Resin.

The substrate may be coated by air spraying, dip coating, knife coating, roll coating or film application such as lamination/heat pressing. The coating may be bonded to the substrate by chemical bonding, mechanical bonding and/or thermal bonding. Mechanical bonding is achieved by force feeding the coating onto the substrate with a knife.

Fire resistant fabric materials made in accordance with this invention may be of any shape. Preferably, such articles are planar in shape. The fire resistant fabric materials may be used in any of a variety of products, including, but not limited to mattress/crib fabrics, mattress/crib covers, upholstered articles, bedroom articles, (including children's bedroom articles), draperies, carpets, wall coverings (including wallpaper) tents, awnings, fire shelters, sleeping bags, ironing board covers, fire resistant gloves, fire-resistant clothing for race car drivers, fire fighters, jet fighter pilots, and the like, building materials, such as roofing shingles, structural laminate facing sheets, building air duct liners, roofing underlayment (or roofing felt), underlayment for organic, built up roofing materials, roll roofing, modified roll products, filter media (including automotive filters), automotive hood liners, head liners, fire walls, vapor barriers etc.

The fire resistant fabric material may be used alone or may be used as a liner for a decorative fabric, such as the type used for mattresses, drapes, sleeping bags, etc. which may also be fire resistant.

The substrate may be coated on one side or both sides depending on the intended application. For instance, if one side of the substrate is coated with the filler/binder coating, the other surface can be coated with another material. In the roofing materials industry, for example, the other material may be conventional roofing asphalt, modified asphalts and non-asphaltic coatings, and the article can then be topped with roofing granules. It is believed that such roofing material could be lighter in weight, offer better fire resistance and better performance characteristics (such as cold weather flexibility, dimensional stability and strength) than prior art roofing materials.

Additionally, the fire resistant fabric material may be coated with a water repellent material or the water repellent material may be added in the coating (i.e., internal water proofing). Two such water repellent materials are Aurapel™ 330R and Aurapel™ 391 available from Sybron/Tanatex of Norwich, Conn. In addition, Onmova Sequapel™ and Sequapel 417 (available from Omnovasolutions, Inc. of Chester, S.C.); BS-1306, BS-15 and BS-29A (available from Wacker of Adrian, Mich.); Syl-off™-7922, Syl-off™-1171A, Syl-off™-7910 and Dow Corning 346 Emulsion (available from Dow Corning, Corporation of Midland, Mich.); Freepel™-1225 (available from BFG Industries of Charlotte, N.C.); and Michem™ Emulsion-41740 and Michem™ Emulsion-03230 (available from Michelman, Inc. of Cincinnati, Ohio) may also be used. It is believed that wax emulsions, oil emulsions, silicone emulsions, polyolefin emulsions and sulfonyls as well as other similar performing products may also be suitable water repellent materials.

A defoamer may also be added to the coating of the present invention to reduce and/or eliminate foaming during production. One such defoamer is Drew Plus Y-250 available from Drews Industrial Division of Boonton, N.J. In addition, ionic materials may be added to increase the ionic charge of the coating, such as ammonium hydroxide, Natrosol-HEC™ available from Hercules of Wilmington, Del.) and ASE-95NP and ASE-60 (available from Rohm & Haas of Charlotte, N.C.).

Further, fire resistant fabric materials made in accordance with the invention may be coated with an algaecide such as zinc powder, copper oxide powder or the herbicides Atrazine available from e.g. Ribelin Industries or Diuron available from e.g. Olin Corporation, an antifungal material such as Micro-Chek™ 11P, an antibacterial material such as Micro-Chek™ 11-S-160, a surface friction agent such as Byk™-375, a flame retardant material such as ATH (aluminum trihydrate) available from e.g. Akzo Chemicals and antimony trioxide available from e.g. Laurel Industries. In addition, color pigments, including, but not limited to, T-113 (Abco, Inc.), W-4123 Blue Pigment, W2090 Orange Pigment, W7717 Black Pigment and W6013 Green Pigment, iron oxide red pigments (available from Engelhard of Louisville, Ky.) may also be added to the coating of the present invention to impart desired characteristics, such as a desired color. The Micro-Chek™ products are available from the Ferro Corporation of Walton Hills, Ohio. Byk-375 may be obtained from Wacker Silicone Corporation of Adrian, Mich. and T-1133A is sold by Abco Enterprises Inc. of Allegan, Mich.

The additional coatings of, e.g. water repellent material, antifungal material, antibacterial material, etc., may be applied to one or both sides of fire resistant fabric materials otherwise having filler/binder coatings on one or both sides of the substrate. For example, fire resistant fabric materials comprising substrates coated on one or both sides with filler/binder coatings could be coated on one side with a water repellent composition and on the other side with an antibacterial agent. Alternatively, the water repellant material, antifungal material, antibacterial material, etc., may be added to the coating before it is used to coat the substrate.

Foamed fire resistant fabric materials made in accordance with the present invention may be made by any of the known methods for making foamed compositions such as, for example, aeration by mechanical mixing and the other techniques described in U.S. Pat. No. 5,110,839.

EXAMPLE I

To produce the fire resistant fabric materials of the present invention, the applicant formulated the coating using just three major components, water, filler and binder (see Table I above). The amounts of the major constituents were as follows: approximately 28% water, 25% Hycar 2679, and 23% clay (dry percentages are 0%, 23% and 42% respectively). Additional filler materials, decabromodiphenyloxide (approximately 9% of the wet formula weight and 16% of the dry formula weight) and antimony trioxide (approximately 3% of the wet formula weight and 5.6% of the dry formula weight) were also added. The binders Cymel 373 (approximately 3.7% wet/5.9% dry) and Rhoplex TR-407 (approximately 4.5% wet and 3.8% dry) were also used. In total, the binder and filler made up 59.6% wet and 47.10% dry of the total coating. Dye and defoaming agent made up less than 1% of the dry formulation, water repellant made up less than 2% of the dry formulation, ionic material (ammonium hydroxide) made up less than 1% of the dry formulation and defoaming agent made up less than 0.2% of the dry formulation. The defoaming agent was Drew Plus Y-250. The materials were mixed in a reaction or mixing kettle for 45 minutes.

The coating was used to coat a fiberglass mat on one and both sides. The mat was manufactured by Elk Corporation of Ennis, Tex. and had a basis weight in the range of 1.4 lb./sq. to 2.0 lb./sq. The mat had a porosity in the range of 800 to 1,000 cfm/ft². Generally, when such highly porous mats have been coated on one side only, the coating bleeds through to the other side. In accordance with the present invention however, the novel coating comprising clay coated the surface of the fiberglass mat very well and did not bleed through to the other side of the mat. The coated article was durable and flexible and did not crack on bending. Typical tensile strength measurements for uncoated versus coated were 75 lbs/3" and 217 lbs/3" respectively. Typical Elmendorff tear strength measurements were ≦3200 grams without the sample tearing.

The fire resistant fabric material was checked for combustibility. When exposed to the flame of a Bunsen Burner from a distance of two inches, woven fabric and wet lay fabric failed the fire test (i.e. the glass fiber melted or a hole was created where the flame hit the fabric). However, when the fire resistant fabric material of the present invention was exposed to the flame of a Bunsen Burner from a distance of two inches for a period of five minutes or more, no hole was created and the glass fibers did not melt. The coating protected the glass fabric from melting or disintegrating and the integrity of the glass fabric structure was maintained. The Technical Bulletin 129 of the State of California Department of Consumer Affairs Bureau of Home Furnishings and Thermal Insulation (October 1992) indicates that a fabric should maintain integrity when exposed to an open flame for 20 minutes and that test was passed in the lab with the present invention.

Surprisingly, when the coating of the present invention was used to coat the fiberglass mat on one side, it did not bleed through to the other side even though the coating had a relatively low viscosity of approximately 1000 cp. Although not wishing to be bound by any particular theory, the applicant believes that the coating did not bleed through the mat because the fiberglass mat is anionic and the coating of the present invention (when wet) includes a combination of water and Hycar 2679 (which together are anionic) and clay filler (which is made anionic by the presence of antimony trioxide). The addition of the ammonium hydroxide increased the anionic charge of the coating. The resultant formulation had a low viscosity believed to be due to the repulsion of charges of the anionic latex in water and the anionic clay/ammonium hydroxide. Although low viscosity is not a desired objective for coating a highly porous mat, the unique characteristic of the invention is that the coating does not bleed through regardless of the viscosity because the mat is also anionic and like charges repel each other just as the north pole of one magnet repels the north pole of another magnetic.

If desired, however, the viscosity of the coating can be increased through mixing. The water and latex solution to which filler and ammonium hydroxide were added is acidic in nature and, on prolonged mixing, there is some hydrolysis thereby increasing the viscosity of the coating. The longer or the more rapidly the coating is mixed, the higher the viscosity. However, the coating still maintains an essentially anionic charge and thus there is still repelling of charges between the coating and the substrate.

Whether slowly or rapidly mixed, the coatings of the present invention may be applied to the substrates in relatively uniform thin coats because the like charges among the filler and acrylic latex elements in the coating repel one another. Thus, it is believed that the ionic charge repulsion characteristic which prevents the coating from bleeding through the mat also enables the application on the mat of a relatively uniform thin film coating. In instances where, due to price, supply or other considerations, the filler material to be employed has an ionic charge which is essentially the opposite of the charge of the substrate, modifiers are available to coat the filler material so that ultimately the coating and substrate of the article have essentially the same ionic charge. It is believed that viscosity modifiers could serve such a purpose.

The invention provides a fire resistant fabric material which is flexible, pliable has good drapability characteristics and which shows no signs of cracking, etc. The coated fabric has a porosity of less than 10.4 cfm (uncoated has a porosity of 440 cfm)_and adheres very well to other materials, including decorative fabrics, polyurethane foam, isocyanurate foam, asphaltic compounds, and granules (non-asphaltic shingle components).

The coated product may have few pinholes or may have numerous pinholes and still maintain a porosity of less than from approximately 5 to approximately 50 cfm when coated with solvent based adhesive such as Firestone Bonding Adhesive BA-2004 which does not bleed through the coated product.

The fire resistant fabric materials were made water repellent by adding to the coating the water repellent materials listed above. The application of the coating to the substrate was accomplished by diluting the coating compound with water and then kiss coating the articles on one side while they were being coated on the other side by standard coating techniques which included the use of a doctor blade. The coating may also be performed by dip coating, scraping with a blade, or squeezing between two rolls having a gap that determines the thickness of the coating.

Prior to coating with a water repellent coating, the novel coating of the present invention can be treated with pigment or dye or any other suitable coloring means to give color to the fire resistant fabric materials of the invention. For instance, a W-4123 Blue Pigment (available from Engelhard of Louisville, Ky.) (0.5% by wet weight) was added to the coating composition to give color texture to the finished coating on the fiberglass mat.

Besides water repellent treatment, the fire resistant fabric materials of the present invention can be coated with antifungal, antibacterial and surface friction agents, an algaecide and/or a flame retardant material by mixing with the coating constituents prior to coating the substrate or by spraying on the partly finished articles at some point in the processing, e.g. between drying and curing.

Coating of the fiberglass substrates was accomplished using a hand-held coater which can be obtained from the Gardner Company, but any conventional method, such as spraying, dipping and flow coating from aqueous or solvent dispersion, calendering, laminating and the like, followed by drying and baking, may be employed to coat the substrate as is well known in the art. Best coating results were observed using a Gardner profile 10 blade. After coating, the samples were placed in an oven at approximately 400° for about 2.0 minutes to achieve drying and curing. Additionally, the coating may be separately formed as a film of one or more layers for subsequent combination with the substrate.

Hycar™ 2679 acrylic latex polymer has a low Brookfield viscosity of 100 cP. The low viscosity makes the polymer easily miscible with water and filler. This heat reactive acrylic polymer is compatible with all fillers due to its anionic charge. Products made with coatings which include the polymer are flexible at extreme high and low temperatures because the polymer has a glass transition temperature (Tg) of −3 C.

Hycar™ 2679 polymer emulsion contains a colloidal dispersion of polymer and copolymers in water, emulsifiers, such as synthetic soap (sometimes known as surface active agents or surfactants) and other ingredients such as buffers and protective colloids. These ingredients enable the polymer to be compatible with a wide variety of fillers. Without being bound to any particular theory, it is believed that Hycar™ 2679, with its thixotropic characteristics, enhances the viscosity of most fillers.

It is believed that a preferred embodiment is prepared by combining constituents in the following wet amounts: 27.47% water, 25% Hycar™ 2679 acrylic latex, 3.7% Cymel™ 373, 4.5% RHOPLEX™ TR-407, 22.6% mattress grade clay, 3% antimony trioxide, 9% decabromodiphenyloxide, 0.05% Natrosol™ HEC, 2.5% Aurapel™-391, 0.5% Acrysol™ ASE-95NP, 1.13% ammonium hydroxide, 0.1% Y-250 defoamer and 0.5% W4123 Blue Pigment.

It should be understood that the above examples are illustrative, and that compositions other than those described above can be used while utilizing the principals underlying the present invention. For example, other sources of filler as well as mixtures of acrylic latex and/or surfactants can be used in formulating the fire resistant fabric materials of the present invention. Moreover, the coating compositions can be applied to various types of substrates, as described above.

What is claimed is:

1. A fire resistant mattress fabric comprising a decorative fabric and a fire resistant fabric material which comprises a substrate having an ionic charge coated with a coating having essentially the same ionic charge wherein said coating consists essentially of a filler material comprising clay and a binder material and wherein said binder material bonds the filler material together and to the substrate and wherein said coating does not bleed through said substrate, and wherein said fire resistant fabric material is drapable and has a porosity of between 5 and 50 cfm.

2. A fire resistant mattress fabric comprising a decorative fabric and a fire resistant fabric material which comprises a substrate coated with a coating consisting essentially of a filler material comprising clay and a binder material wherein
   a) said substrate comprises glass fibers and wherein said material is from 65% to 90% by weight of the glass fibers;
   b) said coating is from 20% to 80% wet weight of filler and from 80% to 20% wet weight of acrylic latex binder material; and
   c) wherein said fire resistant fabric material is drapable and has a porosity of between 5 and 50 cfm.

3. A mattress comprising a fire resistant fabric material which comprises a substrate having an ionic charge coated with a coating having essentially the same ionic charge wherein said coating consists essentially of a filler material comprising clay and a binder material and wherein said binder material bonds the filler material together and to the substrate and wherein said coating does not bleed through said substrate, and wherein said fire resistant fabric material is a drapable fabric and has a porosity of between 5 and 50 cfm.

4. A mattress comprising a fire resistant fabric material which comprises a substrate coated with a coating consisting essentially of a filler material comprising clay and a binder material wherein
   a) said substrate comprises glass fibers and wherein said material is from 65% to 90% by weight of the glass fibers;
   b) said coating is from 20% to 80% wet weight of filler and from 80% to 20% wet weight of acrylic latex binder material; and
   c) wherein said fire resistant fabric material is a drapable fabric and has a porosity of between 5 and 50 cfm.

5. A mattress comprising a fire resistant fabric having a decorative fabric and a fire resistant fabric material which comprises a substrate having an ionic charge coated with a coating having essentially the same ionic charge wherein said coating consists essentially of a filler material comprising clay and a binder material and wherein said binder material bonds the filler material together and to the substrate and wherein said coating does not bleed through said substrate, and wherein said fire resistant fabric material is a drapable fabric and has a porosity of between 5 and 50 cfm.

6. A mattress comprising a fire resistant fabric having a decorative fabric and a fire resistant fabric material which comprises a substrate coated with a coating consisting essentially of a filler material comprising clay and a binder material wherein
   a) said substrate comprises glass fibers and wherein said material is from 65% to 90% by weight of the glass fibers; and
   b) said coating is from 20% to 80% wet weight of filler and from 80% to 20% wet weight of acrylic latex binder material; and
   c) wherein said fire resistant fabric material is a drapable fabric and has a porosity of between 5 and 50 cfm.

* * * * *